(12) United States Patent
Hsiao et al.

(10) Patent No.: US 12,529,921 B2
(45) Date of Patent: Jan. 20, 2026

(54) ELECTRONIC DEVICE

(71) Applicant: Innolux Corporation, Miaoli County (TW)

(72) Inventors: Yu-Cheng Hsiao, Miaoli County (TW); Hong-Sheng Hsieh, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 84 days.

(21) Appl. No.: 18/166,482

(22) Filed: Feb. 9, 2023

(65) Prior Publication Data

US 2023/0314863 A1 Oct. 5, 2023

(30) Foreign Application Priority Data

Mar. 31, 2022 (CN) .......................... 202210334326.2

(51) Int. Cl.
*G02F 1/13* (2006.01)
*G02F 1/1335* (2006.01)
*G02F 1/1337* (2006.01)
*G02F 1/1343* (2006.01)

(52) U.S. Cl.
CPC ...... *G02F 1/1323* (2013.01); *G02F 1/133502* (2013.01); *G02F 1/133528* (2013.01); *G02F 1/133531* (2021.01); *G02F 1/1337* (2013.01); *G02F 1/1343* (2013.01); *G02F 1/13439* (2013.01)

(58) Field of Classification Search
CPC ............. G02F 1/1323; G02F 1/133502; G02F 1/133528; G02F 1/133531; G02F 1/1337; G02F 1/1343
See application file for complete search history.

(56) References Cited

U.S. PATENT DOCUMENTS

| 2005/0062921 A1* | 3/2005 | Gao ................... G02F 1/133734 |
| | | 349/130 |
| 2006/0103782 A1* | 5/2006 | Adachi ............. G02F 1/133632 |
| | | 349/96 |
| 2017/0235165 A1* | 8/2017 | Yamada ................ G02F 1/1525 |
| | | 349/33 |
| 2021/0048696 A1* | 2/2021 | Fang ................. G02F 1/133502 |

FOREIGN PATENT DOCUMENTS

| CN | 1389346 | | 1/2003 |
| CN | 201047891 | | 4/2008 |
| CN | 103676270 | | 3/2014 |
| CN | 104156097 | A * | 11/2014 |
| TW | 200515032 | | 5/2005 |
| TW | 201443726 | | 11/2014 |
| TW | 202107179 | | 2/2021 |

OTHER PUBLICATIONS

"Office Action of Taiwan Counterpart Application", issued on Oct. 30, 2023, p. 1-p. 6.
"Office Action of Taiwan Counterpart Application", issued on Dec. 3, 2025, p. 1-p. 6.

* cited by examiner

*Primary Examiner* — Jia X Pan
(74) *Attorney, Agent, or Firm* — JCIPRNET (57) ABSTRACT

An electronic device includes a privacy panel. The privacy panel includes a first substrate, a first alignment layer and a first electrode layer. The first alignment layer is disposed on the first substrate. The first electrode layer is disposed between the first substrate and the first alignment layer. At a wavelength of 550 nm, a refractive index of the first electrode layer is between 1.7 and 2.1.

13 Claims, 5 Drawing Sheets

FIG. 1

| Refractive index of the electrode layer / Refractive index of the alignment layer | 1.772 | 1.861 | 1.950 | 2.038 |
|---|---|---|---|---|
| 1.506 | (100-400 Å, 400-1500 Å) (1200-1800 Å, 400-1500 Å) | (100-200 Å, 400-1500 Å) (1200-1600 Å, 400-1500 Å) | (100-200 Å, 400-1500 Å) (1300-1500 Å, 400-1500 Å) | (100-200 Å, 400-1500 Å) |
| 1.557 | (100-500 Å, 400-1500 Å) (1100-1800 Å, 400-1500 Å) | (100-300 Å, 400-1500 Å) (1200-1600 Å, 400-1500 Å) | (100-200 Å, 400-1500 Å) (1200-1500 Å, 400-1200 Å) | (100-200 Å, 400-1500 Å) |
| 1.608 | (100-500 Å, 400-1500 Å) (1000-1900 Å, 400-1500 Å) | (100-400 Å, 400-1500 Å) (1100-1700 Å, 400-1500 Å) | (100-300 Å, 400-1500 Å) (1200-1500 Å, 400-1200 Å) | (100-200 Å, 400-1500 Å) |
| 1.660 | (100-2100 Å, 400-1500 Å) (2200-3000 Å, 400-1100 Å) | (100-400 Å, 800-1500 Å) (1100-1600 Å, 400-1500 Å) | (100-400 Å, 800-1500 Å) (1100-1400 Å, 400-700 Å) | (100-300 Å, 800-1500 Å) |
| 1.711 | (100-3000 Å, 400-1500 Å) | (100-500 Å, 900-1500 Å) (1000-1500 Å, 400-700 Å) | (100-500 Å, 900-1500 Å) (1000-1400 Å, 400-600 Å) | (100-400 Å, 1000-1500 Å) |
| 1.797 | (100-1400 Å, 400-1500 Å) (2500-2800 Å, 400-700 Å) (1400-1800 Å, 1400-1500 Å) | (100-1400 Å, 400-1500 Å) | (100-600 Å, 1000-1500 Å) (1000-1300 Å, 400-600 Å) | (100-400 Å, 1000-1500 Å) |

ELECTRONIC DEVICE

CROSS-REFERENCE TO RELATED APPLICATION

This application claims the priority benefit of China application serial no. 202210334326.2, filed on Mar. 31, 2022. The entirety of the above-mentioned patent application is hereby incorporated by reference herein and made a part of this specification.

BACKGROUND

Field of the Disclosure

The present disclosure relates to an electronic device.

Description of Related Art

Existing electronic devices are able to realize switchable anti-peeping function by setting a privacy panel on one side of the display panel. However, existing privacy panels have a reflectivity of about 1% or higher. Therefore, when the privacy panel is disposed on the display panel, the reflectivity of the electronic device will increase additionally.

SUMMARY OF THE DISCLOSURE

The present disclosure provides an electronic device, which is able to reduce the reflectivity of a privacy panel.

In an embodiment of the disclosure, an electronic device includes a privacy panel. The privacy panel includes a first substrate, a first alignment layer and a first electrode layer. The first alignment layer is disposed on the first substrate. The first electrode layer is disposed between the first substrate and the first alignment layer. At a wavelength of 550 nanometers (nm), a refractive index of the first electrode layer is between 1.7 and 2.1.

In order to make the above-mentioned features and advantages of the present disclosure more comprehensible, the following specific embodiments are described in detail in conjunction with the accompanying drawings.

DESCRIPTION OF EMBODIMENTS

Reference will now be made in detail to the exemplary embodiments of the present disclosure, examples of which are illustrated in the accompanying drawings. Wherever possible, the same reference numbers are used in the drawings and descriptions to refer to the same or like parts.

Certain terms are adopted throughout the specification and claims of this disclosure to refer to specific components. Those skilled in the art should understand that manufacturers of electronic devices may refer to the same element with different names. This document does not intend to distinguish between those elements that have the same function but have different names. In the following specification and claims, words such as "comprising" and "including" are open-ended words, so they should be interpreted as meaning "including but not limited to . . . ".

The directional terms mentioned herein, such as "up", "down", "front", "rear", "left", "right", etc., are only referring to the directions of the accompanying drawings. Accordingly, the directional terms used are for illustration, not for limitation of the present disclosure. In the drawings, each figure illustrates the general characteristics of methods, structures and/or materials used in particular embodiments. However, these drawings should not be interpreted as defining or limiting the scope or nature encompassed by these embodiments. For example, the relative sizes, thicknesses and positions of layers, regions and/or structures may be reduced or exaggerated for clarity.

A structure (or layer, element, substrate) described in this disclosure being located on/over another structure (or layer, element, substrate) may mean that the two structures are adjacent to each other and directly connected, or mean that the two structures are adjacent to each other rather than directly connected. Indirect connection means that there is at least one intermediate structure (or intermediate layer, intermediate element, intermediate substrate, intermediate space) between two structures, a lower surface of one structure is adjacent to or directly connected to an upper surface of the intermediate structure, and the upper surface of another structure is adjacent to or directly connected to the lower surface of the intermediate structure. The intermediate structure may be composed of a single-layer or multi-layer physical structure or a non-physical structure, the disclosure provides no limitation thereto. In this disclosure, when a certain structure is set "on" other structures, it may mean that a certain structure is "directly" on other structures, or that a certain structure is "indirectly" on other structures, that is, there is at least one structure interposed between the certain structure and other structures.

The terms "about", "equal to", "equivalent to" or "the same as", "substantially", or "approximately" used in the text are generally interpreted as being within 20% of a given value or range, or interpreted as being within 10%, 5%, 3%, 2%, 1%, or 0.5% of a given value or range. In addition, the terms "the range is from the first value to the second value" and "the range is between the first value and the second value" indicate that the range includes the first value, the second value and other values therebetween.

Ordinal numbers such as "first", "second" and the like used in the description and claims of the disclosure are used to modify elements, which do not imply and represent that the (or these) elements are numbered in sequence, or represent the order of a certain element and another element, or the order of the manufacturing method. The use of these ordinal numbers is only used to clearly distinguish the element with a certain name from another element with the same name. The same wording may not be used in claims of the disclosure and the specification. Accordingly, the first component in the specification may be the second component in claims of the disclosure.

The electrical connection or coupling described in this disclosure may refer to direct connection or indirect connection. In the case of direct connection, the terminals of the components on the two circuits are directly connected or connected to each other with a conductor line segment. In the case of indirect connection, there are switches, diodes, capacitors, inductors, resistors, other suitable components, or a combination of the above components between the terminals of the components on the two circuits, but not limited thereto.

In this disclosure, the thickness, length and width may be measured by optical microscope (OM), and the thickness or width may be obtained by measuring the cross-sectional image in the electron microscope, but not limited thereto. In addition, any two values or directions used for comparison may have certain errors. In addition, the terms "equal to", "equivalent to", "same", "substantially" or "roughly" mentioned in the present disclosure are generally interpreted as being within 100% of a given value or range. Moreover, the phrase "a given range is a first value to a second value", "a given range falls within a range of a first value to a second value" or "a given range is between a first value and a second value" means that the given range includes the first value, the second value and other values therebetween. If the first direction is perpendicular to the second direction, the angle between the first direction and the second direction may be between 80 degrees and 100 degrees; if the first direction is parallel to the second direction, the angle between the first direction and the second direction may be between 0 degrees and 10 degrees.

It should be noted that, in the following embodiments, without departing from the spirit of the present disclosure, the features in several different embodiments can be replaced, reorganized, and mixed to complete other embodiments. As long as the features of the various embodiments do not violate the spirit of the disclosure or conflict with each other, they may be mixed and matched freely.

Unless otherwise defined, all terms (including technical and scientific terms) used herein have the same meaning as commonly understood by those skilled in the art. It can be understood that these terms, such as those defined in commonly used dictionaries, should be interpreted as having meanings consistent with the background or context of the related technology and the present disclosure, and should not be interpreted in an idealized or overly formal manner, unless otherwise specified in the disclosed embodiments.

In the present disclosure, the electronic device may include a display device, a backlight device, an antenna device, a sensing device or a splicing device, but not limited thereto. The electronic device may be a bendable or flexible electronic device. The display device may be a non-self-luminous display device or a self-luminous display device. The antenna device may be a liquid crystal type antenna device or a non-liquid crystal type antenna device, and the sensing device may be a sensing device for sensing capacitance, light, thermal energy or ultrasonic waves, but not limited thereto. In the present disclosure, the electronic device may include electronic components, and the electronic components may include passive components and active components, such as capacitors, resistors, inductors, diodes, transistors, and the like. The diodes may include light emitting diodes or photodiodes. The light emitting diodes may, for example, include organic light emitting diodes (OLEDs), mini LEDs, micro LEDs, or quantum dot LED, but not limited to. The splicing device may be, for example, a display splicing device or an antenna splicing device, but is not limited thereto. It should be noted that the electronic device may be any combination of the above, but not limited thereto. In the following, the display device is exemplified as an electronic device or a splicing device to illustrate the content of the disclosure, but the disclosure is not limited thereto.

It should be noted that the technical solutions provided in different embodiments below may be replaced, combined or mixed to form another embodiment without violating the spirit of the present disclosure.

Figure 2:
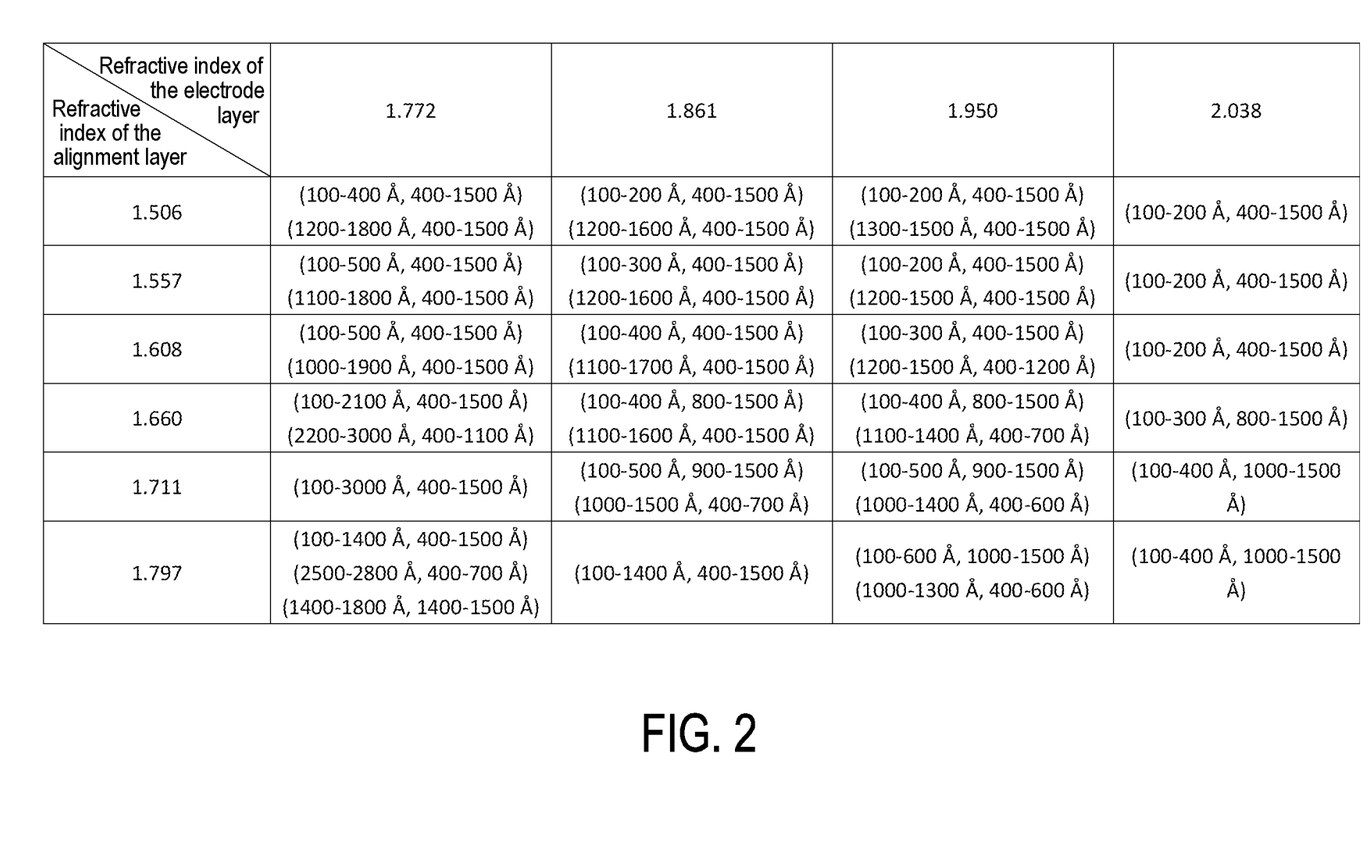
FIG. 2 is a table showing the thicknesses of the electrode layer and the alignment layer at different refractive indices.
Figure 3:
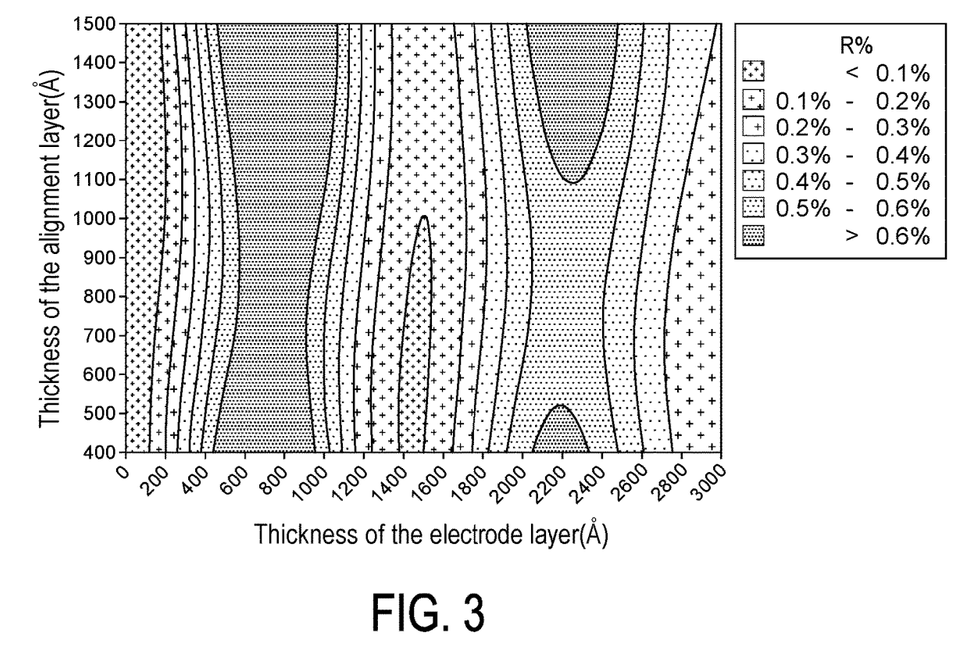
FIG. 3, FIG. 4 and FIG. 6 are distribution diagrams of reflectivity of an electronic device in various conditions.
Figure 4:
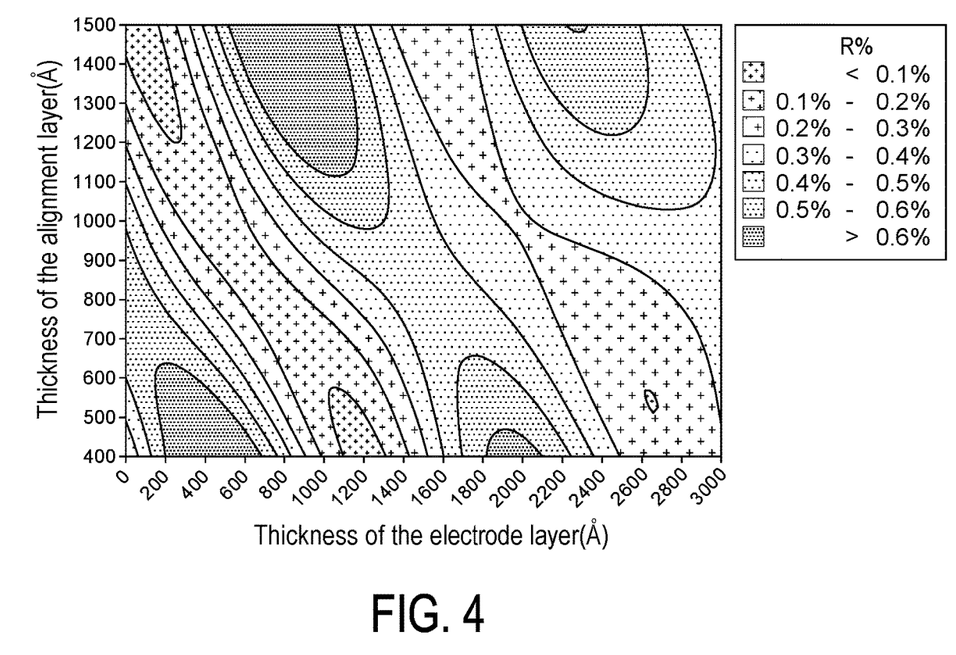

FIG. 1, FIG. 5 and FIG. 7 to FIG. 9 are partial cross-sectional diagrams of electronic devices according to various embodiments of the present disclosure. FIG. 2 is a table showing the thicknesses of the electrode layer and the alignment layer at different refractive indices. FIG. 3, FIG. 4 and FIG. 6 are distribution diagrams of reflectivity of an electronic device in various conditions.

Figure 1:
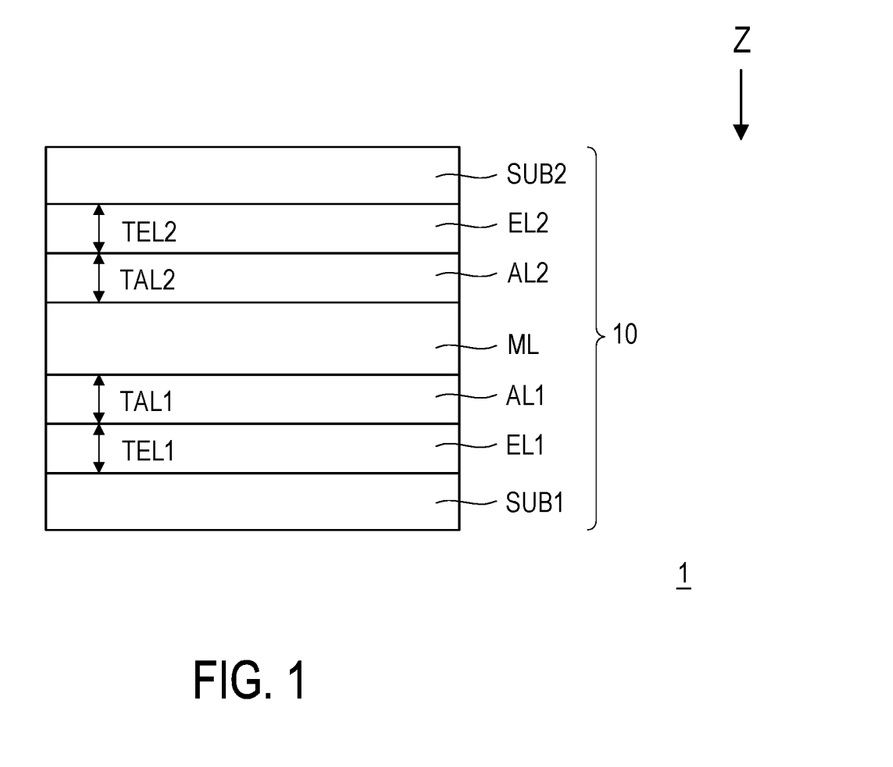
FIG. 1, FIG. 5 and FIG. 7 to FIG. 9 are partial cross-sectional diagrams of electronic devices according to various embodiments of the present disclosure.

Referring to FIG. 1, the electronic device 1 may include a privacy panel 10. The privacy panel 10 may include a first substrate SUB1, a first alignment layer AL1, and a first electrode layer EL1. The first alignment layer AL1 is disposed on the first substrate SUB1. The first electrode layer EL1 is disposed between the first substrate SUB1 and the first alignment layer AL1. At a wavelength of 550 nanometers (nm), the refractive index of the first electrode layer EL1 is between 1.7 and 2.1 (i.e., 1.7≤refractive index≤2.1).

In some embodiments, the first electrode layer EL1 and the first alignment layer AL1 may be sequentially stacked on the first substrate SUB1. The material of the first electrode layer EL1 may include a transparent conductive material (such as metal oxide), such as indium tin oxide, but not limited thereto. The material of the first alignment layer AL1 may include any known alignment material, such as polyimide, but not limited thereto.

In some embodiments, the privacy panel 10 may further include a second substrate SUB2, a second alignment layer AL2, a second electrode layer EL2 and a medium layer ML, but not limited thereto. According to different requirements, one or more elements or layers may be added to or removed from the privacy panel 10. The second substrate SUB2 is disposed on the first substrate SUB1, and the first electrode layer EL1 and the first alignment layer AL1 are located between the first substrate SUB1 and the second substrate SUB2. In some embodiments, the second alignment layer AL2 may be disposed between the second substrate SUB2 and the first alignment layer AL1. The material of the second alignment layer AL2 may include any known alignment material, such as polyimide, but not limited thereto.

In some embodiments, the second electrode layer EL2 is disposed between the second substrate SUB2 and the second alignment layer AL2. The material of the second electrode layer EL2 may include a transparent conductive material (such as metal oxide), such as indium tin oxide, but not limited thereto. In some embodiments, at a wavelength of 550 nm, the refractive index of the second electrode layer EL2 may be between 1.7 and 2.1 (i.e., 1.7 refractive index≤2.1).

In some embodiments, the first substrate SUB1 and/or the second substrate SUB2 may include a rigid substrate or a flexible substrate. The material of the first substrate SUB1 includes, for example, glass, quartz, ceramics, sapphire or plastic, but is not limited thereto. In some embodiments, the first substrate SUB1 may include a flexible substrate, and the material of the first substrate SUB1 may include polycarbonate (PC), polyimide (PI), polypropylene (PP), polyethylene terephthalate (PET), other suitable flexible materials or a combination of the aforementioned materials, but not limited thereto.

In some embodiments, the medium layer ML may be disposed between the first alignment layer AL1 and the second alignment layer AL2. The material of the medium layer ML may include liquid crystal or other suitable materials, but is not limited thereto.

In some embodiments, the reflectivity of the privacy panel 10 may be reduced by changing the refractive index and/or thickness of at least one electrode layer (such as the first electrode layer EL1, the second electrode layer EL2) in the privacy panel 10. For example, the refractive index and/or thickness TEL1 (or thickness TEL2) of the first electrode layer EL1 (or the second electrode layer EL2) may be optimized; or, a symmetrical modulation method may be adopted to modulate the refractive index and/or thickness of the first electrode layer EL1 and the second electrode layer EL2, so that the thickness TEL1 of the first electrode layer EL1 is substantially the same as the thickness TEL2 of the second electrode layer EL2, and/or the refractive index of the first electrode layer EL1 is substantially the same as the refractive index of the second electrode layer EL2; alternatively, an asymmetric modulation method may be adopted to modulate the refractive index and/or thickness of the first electrode layer EL1 and the second electrode layer EL2, so that the thickness TEL1 of the first electrode layer EL1 is different from the thickness TEL2 of the second electrode layer EL2, and/or the refractive index of the first electrode layer EL1 is different from that of the second electrode layer EL2.

The method for changing the refractive index of the electrode layer may, for example, include changing the material of the electrode layer (e.g., the ratio of various ingredients) or changing the process parameters of the electrode layer when a fixed material is used. Taking indium tin oxide as a material of the electrode layer as an example, the refractive index of the electrode layer may be changed by adjusting the ratio of hydrogen to oxygen in a coating chamber, a baking temperature after coating, a baking time after coating, or a combination of the above, but not limited thereto. The thickness (such as thickness TEL1 or thickness TEL2) of various electrode layers mentioned above refers to the average thickness of the electrode layer in the top view direction (such as direction Z) from the privacy panel 10. The average thickness is, for example, the average thickness of the thicknesses measured from any three regions under a section. The aforementioned same thickness means that the difference in thickness falls within 10%, for example. The aforementioned same refractive index means that the difference in refractive index falls within 10%, for example.

In some embodiments, at a wavelength of 550 nm, the refractive index of the first electrode layer EL1 may be between 1.7 and 2.1 (i.e., 1.7 refractive index 2.1), and/or the thickness TEL1 of the first electrode layer EL1 may be between 100 Å and 3000 Å (i.e., 100 Å≤thickness TEL1≤3000 Å). In some embodiments, at a wavelength of 550 nm, the refractive index of the second electrode layer EL2 may be between 1.7 and 2.1 (that is, 1.7 refractive index 2.1), and/or the thickness TEL2 of the second electrode layer EL2 may be between 100 Å and 3000 Å (i.e., 100 Å≤thickness TEL2≤3000 Å). Through the above design, the reflectivity of the privacy panel may be reduced to 0.6% or less.

In some embodiments, as shown in FIG. 2, by changing the refractive index and thickness (such as thickness TEL1, thickness TEL2, thickness TAL1, thickness TAL2 in FIG. 1) of at least one electrode layer (such as the first electrode layer EL1, the second electrode layer EL2) and at least one alignment layer (such as the first alignment layer, second alignment layer AL2) in the privacy panel 10, it is possible to reduce the refractive index of the privacy panel 10, but the disclosure is not limited thereto. For example, the refractive index and thickness of the electrode layer and alignment layer on one side of the medium layer ML may be changed, or, the refractive index and thickness of the electrode layer and alignment layer on both sides of the medium layer ML may be changed to reduce the refractive index of the privacy panel 10.

In FIG. 2, at a wavelength of 550 nm, the refractive index of the electrode layer is exemplified as 1.772, 1.861, 1.950 and 2.038, and the refractive index of the alignment layer is exemplified as 1.506, 1.557, 1.608, 1.660, 1.711 and 1.797. However, it should be understood that the refractive index of the electrode layer may be any value within the range of 1.7 to 2.1, the refractive index of the alignment layer may be any value within the range of 1.5 to 1.8, and the refractive index of the electrode layer or alignment layer may vary depending on the selected materials or process parameters, and is not limited to those listed in FIG. 2.

In FIG. 2, the commas in parentheses separate two numerical ranges, the numerical range before the comma indicates the thickness range of the electrode layer, and the numerical range after the comma indicates the thickness range of the alignment layer. For example, please refer to FIG. 2 and FIG. 3. FIG. 2 exemplifies that the refractive index of the electrode layer (such as one or both of the first electrode layer EL1 and the second electrode layer EL2) is 1.772, and the refractive index of the alignment layer (such as one or both of the first alignment layer AL1 and the second alignment layer AL2) is 1.557. Under the circumstances, as shown in FIG. 2, "(100-500 Å, 400-1500 Å) and (1100-1800 Å, 400-1500 Å)" means that when the thickness of the electrode layer is 100 Å to 500 Å, the thickness of the alignment layer is 400 Å to 1500 Å, or when the thickness of the electrode layer is 1100 Å to 1800 Å, the thickness of the alignment layer is 400 Å to 1500 Å. When any of the above conditions is satisfied, the reflectivity of the privacy panel 10 may be reduced, for example, to 1% or less (e.g., 0.6% or 0.3% or less), as shown in FIG. 3.

In addition, please refer to FIG. 2 and FIG. 4. FIG. 2 exemplifies that the refractive index of the electrode layer is 1.772 and the refractive index of the alignment layer is 1.711. "(100-3000 Å, 400-1500 Å)" means that when the thickness of the electrode layer is 100 Å to 3000 Å, and the thickness of the alignment layer is 400 Å to 1500 Å. When this condition is satisfied, the reflectivity of the privacy panel 10 may be reduced, for example, to 1% or less (0.6% or less). Other descriptions in the tables may be interpreted in the same way, and the details will not be repeated below.

Figure 5:
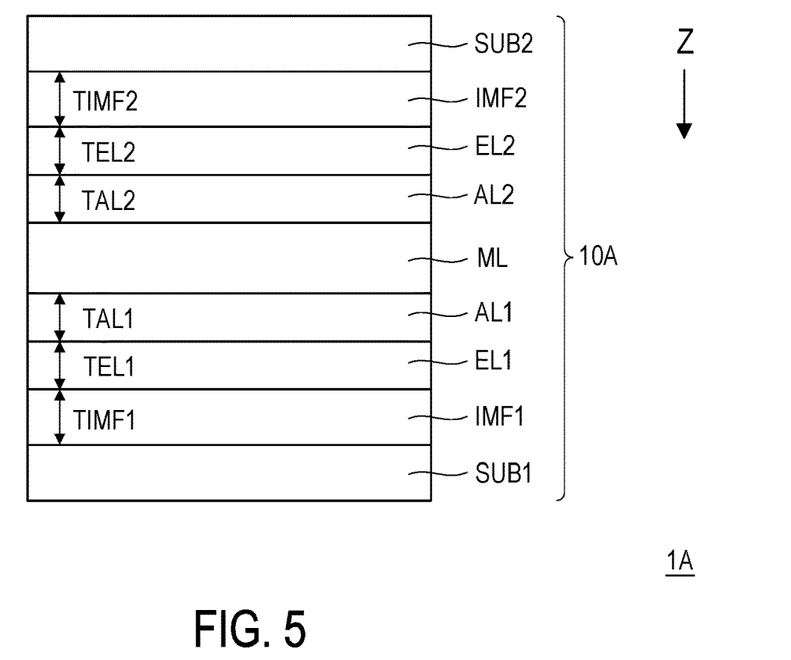
Figure 6:
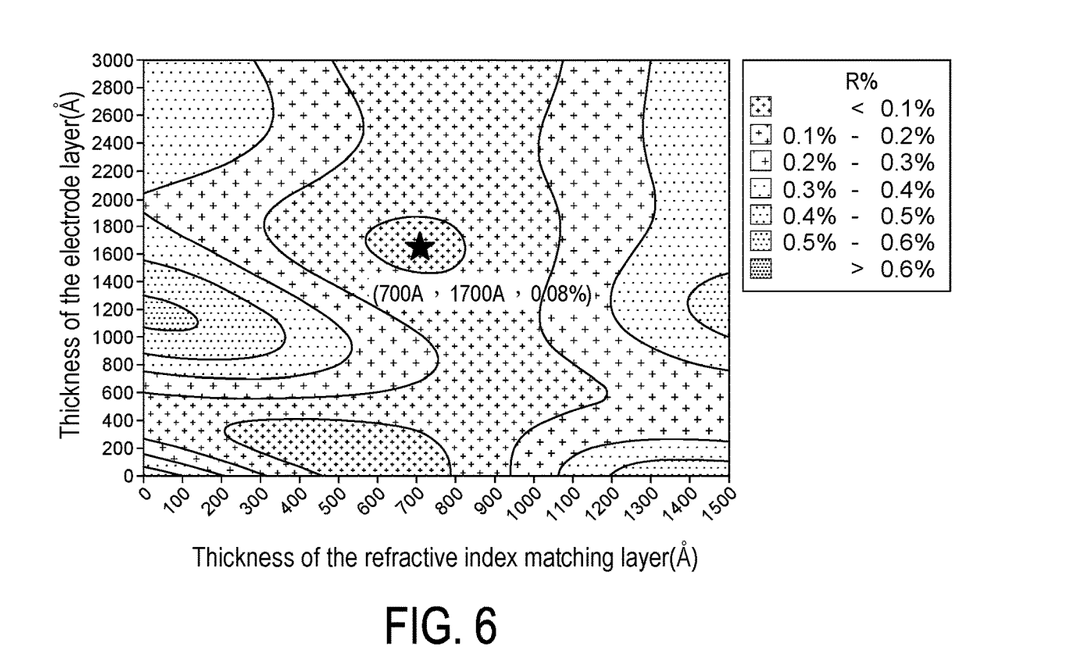

Please refer to FIG. 5, in the electronic device 1A, the privacy panel 10A not only includes the first substrate SUB1, the first alignment layer AL1, the first electrode layer EL1, the second substrate SUB2, the second alignment layer AL2, the second electrode layer EL2 and the medium layer ML, but also includes a refractive index matching layer IMF1 and/or a refractive index matching layer IMF2. The refractive index matching layer IMF1 may be disposed between the first substrate SUB1 and the first electrode layer EL1, and the refractive index matching layer IMF2 may be disposed between the second substrate SUB2 and the second electrode layer EL2.

In other embodiments, although not shown in the drawings, one of the refractive index matching layer IMF1 and the refractive index matching layer IMF2 may be omitted from the privacy panel 10A.

Not only that the refractive index of the privacy panel 10A may be reduced by changing the refractive index and/or thickness of at least one electrode layer, changing the refractive index and/or thickness of at least one alignment layer, or changing a combination of the above, but also the refractive index of the privacy panel 10A may be further reduced by providing at least one refractive index matching layer (such as one or both of the refractive index matching layer IMF1 and the refractive index matching layer IMF2). In some embodiments, at a wavelength of 550 nm, the refractive index of the refractive index matching layer (such as one or both of the refractive index matching layer IMF1 and the refractive index matching layer IMF2) may be between 1.5 and 1.8 (i.e., 1.5≤refractive index≤1.8), but not limited thereto. In some embodiments, the material of the refractive index matching layer (such as one or both of the refractive index matching layer IMF1 and the refractive index matching layer IMF2) may include silicon oxide ($SiO_x$), silicon nitride ($SiN_x$), silicon oxynitride ($SiO_xN_y$) or a combination of at least two of the above, but not limited thereto.

In some embodiments, the refractive index of the privacy panel 10A may be reduced by changing the refractive index and/or thickness (such as the thickness TIMF1 or the thickness TIMF2) of the refractive index matching layer (such as one or both of the refractive index matching layer IMF1 and the refractive index matching layer IMF2).

For example, FIG. 6 shows the simulation result of reflectivity in the condition where the refractive index of the material of the electrode layer is, for example, 1.772, the refractive index of the material of the alignment layer is, for example, substantially 1.711, the thickness of the alignment layer is substantially 1000 Å, and the refractive index of the material of the refractive index matching layer is, for example, substantially 1.666. It can be seen from FIG. 6 that when the thickness of the refractive index matching layer is substantially 700 Å and the thickness of the electrode layer is substantially 1700 Å, the reflectivity of the privacy panel may be reduced, for example, to 1% or less (0.6%, or even 0.1% or less). It should be understood that FIG. 6 is only a schematic illustration of an example, and the material, refractive index or thickness of any one of the electrode layer, the alignment layer and the refractive index matching layer may vary depending on different requirements.

Figure 7:
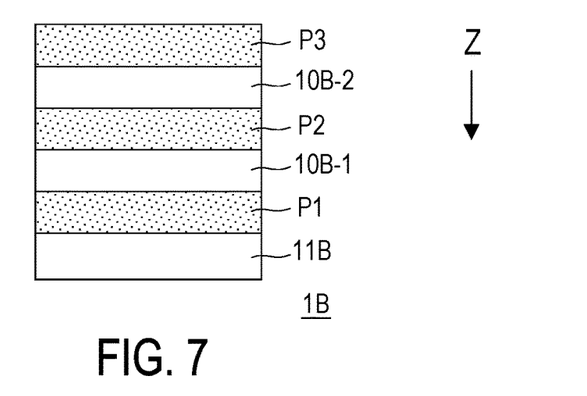

Referring to FIG. 7, the electronic device 1B may include a privacy panel 10B-1, a privacy panel 10B-2, a display panel 11B, a polarizer P1, a polarizer P2 and/or a polarizer P3, but not limited thereto.

The privacy panel 10B-1 and the privacy panel 10B-2 are, for example, stacked sequentially on the display panel 11B. Each of the privacy panel 10B-1 and the privacy panel 10B-2 may adopt the privacy panel 10 shown in FIG. 1, the privacy panel 10A shown in FIG. 5, or improvement of the above privacy panels, no further details are incorporated herein. The display panel 11B may be a self-luminous panel, but not limited thereto. The display panel 11B may include organic light emitting diodes (OLEDs), mini LEDs, micro LEDs, or quantum dot LED, but is not limited thereto.

In some embodiments, the polarizer P1, the polarizer P2 and/or the polarizer P3 are, for example, linear polarizers, but are not limited thereto. The polarizer P1 may be disposed between the display panel 11B and the privacy panel 10B-1, the polarizer P2 may be disposed between the privacy panel 10B-1 and the privacy panel 10B-2, the polarizer P3 is disposed on the privacy panel 10B-2, and the privacy panel 10B-2 is disposed between the polarizer P2 and the polarizer P3. In this embodiment, the polarizer P1, the polarizer P2, and the polarizer P3 may have, for example, transmission axes substantially parallel to each other, but not limited thereto.

In this embodiment, the display panel 11B and the privacy panel 10B-1 may, for example, share the polarizer P1, but not limited thereto. In other embodiments, although not shown in the drawings, there may be two polarizers between the display panel 11B and the privacy panel 10B-1, and the two polarizers may have transmission axes substantially parallel to each other. It should also be understood that the number of privacy panels and polarizers corresponding to the privacy panels in the electronic device 1B may vary depending on requirements. In other embodiments, although not shown in the drawings, the number of privacy panels in the electronic device 1B may be one or more. For example, the privacy panel 10B-2 and the polarizer P3 may be omitted from the electronic device 1B.

Through the above-mentioned design of the privacy panel, the electronic device 1B is able to switch between the anti-peeping mode (narrow viewing angle mode) and the general display mode (wide viewing angle mode). For example, the privacy panel may be switched between the transparent state and the scattering state by changing the voltage difference between the electrode layers on the upper and lower sides of the medium layer in the privacy panel, so that the light beam passing through the privacy panel is relatively collimated or divergent, thereby changing the visible range of the electronic device 1B.

Figure 8:
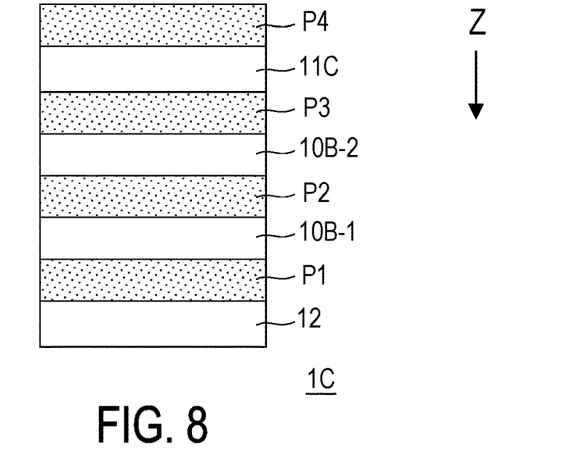

Referring to FIG. 8, the electronic device 1C may include a privacy panel 10B-1, a privacy panel 10B-2, a display panel 11C (such as a non-self-luminous display panel), a backlight module 12, a polarizer P1, a polarizer P2, a polarizer P3 and/or a polarizer P4, but not limited thereto.

In some embodiments, the privacy panel 10B-1 and the privacy panel 10B-2 may be, for example, stacked sequentially on the backlight module 12 and located between the display panel 11C and the backlight module 12. The display panel 11C may include a liquid crystal display panel or other suitable panels, but is not limited thereto.

In this embodiment, the polarizer P1, the polarizer P2, the polarizer P3, and the polarizer P4 are, for example, linear polarizers, but are not limited thereto. The polarizer P1 is disposed between the backlight module 12 and the privacy panel 10B-1, the polarizer P2 is disposed between the privacy panel 10B-1 and the privacy panel 10B-2, the polarizer P3 is disposed between the privacy panel 10B-2 and the display panel 11C, the polarizer P4 is disposed on the display panel 11C, and the display panel 11C is disposed between the polarizer P3 and the polarizer P4. In this embodiment, the polarizer P1, the polarizer P2, and the polarizer P3 may have transmission axes parallel to each other, and the transmission axis of the polarizer P4 is, for example, substantially perpendicular to the polarizer P3, and the transmission axis of the polarizer P3 is, for example, substantially parallel to the transmission axis of the polarizer P2 and/or the polarizer P1, but not limited thereto.

In this embodiment, the display panel 11C and the privacy panel 10B-2, for example, share the polarizer P3, but not limited thereto. In other embodiments, although not shown in the drawings, there may be two polarizers between the display panel 11C and the privacy panel 10B-2, and the two polarizers may have transmission axes substantially parallel to each other. It should also be understood that the number of privacy panels and polarizers corresponding to the privacy panels in the electronic device 1C may vary depending on requirements. In other embodiments, although not shown in the drawings, the number of privacy panels in the electronic device 1C may be one or more. For example, the privacy panel 10B-2 and the polarizer P3 may be omitted from the electronic device 1C.

Figure 9:
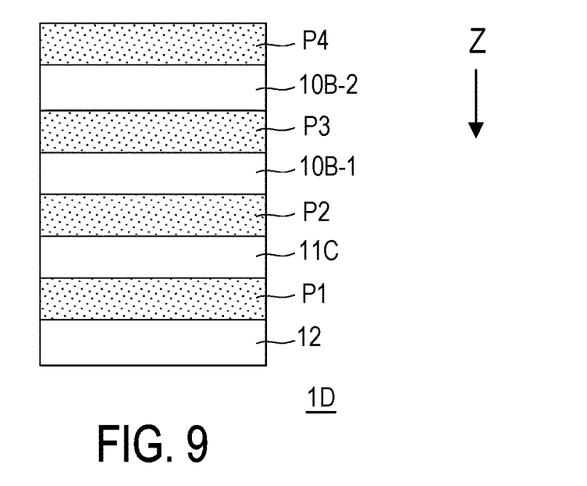

Referring to FIG. 9, the electronic device 1D may include a privacy panel 10B-1, a privacy panel 10B-2, a display panel 11C (such as a non-self-luminous display panel), a backlight module 12, a polarizer P1, a polarizer P2, a polarizer P3 and/or a polarizer P4, but not limited thereto.

In this embodiment, the privacy panel 10B-1 and the privacy panel 10B-2 are sequentially stacked on the backlight module 12, and the display panel 11C is located between the privacy panel 10B-1 and the backlight module 12.

In this embodiment, the polarizer P1, the polarizer P2, the polarizer P3, and the polarizer P4 are, for example, linear polarizers, but are not limited thereto. The polarizer P1 is disposed between the backlight module 12 and the display panel 11C, the polarizer P2 is disposed between the display panel 11C and the privacy panel 10B-1, the polarizer P3 is disposed between the privacy panel 10B-1 and the privacy panel 10B-2, the polarizer P4 is disposed on the privacy panel 10B-2, and the privacy panel 10B-2 is disposed between the polarizer P3 and the polarizer P4. In this embodiment, the polarizer P2, the polarizer P3, and the polarizer P4 may have transmission axes substantially parallel to each other, and the transmission axis of the polarizer P1 is, for example, substantially perpendicular to that of the polarizer P2, but not limited thereto.

In this embodiment, the display panel 11C and the privacy panel 10B-1 share the polarizer P2, but not limited thereto. In other embodiments, although not shown in the drawings, there may be two polarizers between the display panel 11C and the privacy panel 10B-1, and the two polarizers may have transmission axes substantially parallel to each other. It should also be understood that the number of the privacy panels and polarizers corresponding to the privacy panels in the electronic device 1D may vary depending on requirements. In other embodiments, although not shown in the drawings, the number of privacy panels in the electronic device 1D may be one or more. For example, the privacy panel 10B-2 and the polarizer P4 may be omitted from the electronic device 1D.

To sum up, in the embodiments of the present disclosure, by controlling the design parameters (such as refractive index or thickness, etc.) of at least one layer (such as the first electrode layer), it is possible to reduce the reflectivity of the privacy panel.

The above embodiments are only used to illustrate the technical solutions of the present disclosure, rather than to limit them; although the present disclosure has been described in detail with reference to the foregoing embodiments, those with ordinary knowledge in the technical field should understand that: The technical solutions described in the foregoing embodiments may be modified, or some or all of the technical features may be equivalently replaced; and these modifications or replacements do not make the essence of the corresponding technical solutions depart from the scope of the technical solutions of the embodiments disclosed in the present disclosure.

Although the embodiments of the disclosure and their advantages have been disclosed above, it should be understood that any person with ordinary knowledge in the technical field may make changes, substitutions and modifications without departing from the spirit and scope of the disclosure, the features between the various embodiments can be arbitrarily mixed and replaced to form other new embodiments. In addition, the scope to be protected by the present disclosure is not limited to the process, machine, manufacture, material composition, device, method and steps in the specific embodiments described in the specification, and anyone with ordinary knowledge in the technical field can learn from the content of the present disclosure that the current or future developed process, machine, manufacture, material composition, device, method and step can be implemented according to the present disclosure as long as it can perform substantially the same function or obtain substantially the same result in the embodiments described herein. Therefore, the scope to be protected by the present disclosure includes the above-mentioned process, machine, manufacture, material composition, device, method and steps. In addition, each claim constitutes an individual embodiment, and the scope to be protected by the present disclosure also includes the combination of various claims and the embodiments. The scope to be protected by the disclosure should be defined by the scope of the attached claims.

What is claimed is:

1. An electronic device, comprising:
   a privacy panel, comprising:
   a first substrate;
   a second substrate, opposite to the first substrate;
   a medium layer, disposed between the first substrate and the second substrate;
   a first alignment layer, disposed between the first substrate and the medium layer;
   a second alignment layer, disposed between the second substrate and the medium layer; a first electrode layer, disposed between the first substrate and the first alignment layer,
   wherein at a wavelength of 550 nanometers (nm), a refractive index of the first electrode layer is between 1.772 and 2.1, and a refractive index of the first alignment layer is between 1.5 and 1.711;
   a second electrode layer, disposed between the second substrate and the second alignment layer;
   a first refractive index matching layer, disposed between the first substrate and the first electrode layer; and
   a second refractive index matching layer, disposed between the second substrate and the second electrode layer, wherein a reflectivity of the privacy panel is less than or equal to 1%, the refractive index of the first alignment layer is less than the refractive index of the first electrode layer and greater than a refractive index of the first refractive index matching layer,
   wherein a thickness of the first alignment layer is less than a thickness of the first electrode layer and greater than a thickness of the first refractive index matching layer, a refractive index of the second alignment layer is less than a refractive index of the second electrode layer and greater than a refractive index of the second refractive index matching layer, and a thickness of the second alignment layer is less than a thickness of the second electrode layer and greater than a thickness of the second refractive index matching layer;
   another privacy panel, disposed on the privacy panel;
   a display panel, wherein the privacy panel is disposed between the another privacy panel and the display panel;
   a first polarizer, disposed between the display panel and the privacy panel;
   a second polarizer, disposed between the privacy panel and the another privacy panel; and
   a third polarizer, wherein the another privacy panel is disposed between the second polarizer and the third polarizer;
   wherein the first polarizer, the second polarizer, and the third polarizer have transmission axes parallel to each other.

2. The electronic device according to claim 1, wherein the thickness of the first electrode layer is between 1501 Å and 3000 Å.

3. The electronic device according to claim 1, wherein the privacy panel further comprises:

wherein at the wavelength of 550 nm, the refractive index of the second electrode layer is between 1.772 and 2.1;
at the wavelength of 550 nm, the refractive index of the second alignment layer is between 1.5 and 1.711.

4. The electronic device according to claim 1, wherein the thickness of the second electrode layer is between 1501 Å and 3000 Å.

5. The electronic device according to claim 1, wherein the thickness of the first electrode layer is the same as the thickness of the second electrode layer, and the refractive index of the first electrode layer is the same as the refractive index of the second electrode layer.

6. The electronic device according to claim 1, wherein the refractive index of the first electrode layer is different from the refractive index of the second electrode layer.

7. The electronic device according to claim 1, wherein
the medium layer is disposed between the first alignment layer and the second alignment layer.

8. The electronic device according to claim 7, wherein a material of the medium layer comprises liquid crystal.

9. The electronic device according to claim 1, wherein at the wavelength of 550 nm, the refractive index of the first refractive index matching layer and the refractive index of the second refractive index matching layer are between 1.5 and 1.71.

10. The electronic device according to claim 1, wherein a material of the first refractive index matching layer and a material of the second refractive index matching layer comprise silicon oxide, silicon nitride, silicon oxynitride, or a combination of at least two of the above.

11. The electronic device according to claim 1, wherein the thickness of the first electrode layer is between 1501 Å and 3000 Å, and the thickness of the first alignment layer is between 701 Å and 1500 Å.

12. The electronic device according to claim 1, wherein the first polarizer, the second polarizer, and the third polarizer are linear polarizers.

13. The electronic device according to claim 1, further comprising:
a backlight module, wherein the privacy panel is disposed on the backlight module;
wherein the privacy panel is disposed between the another privacy panel and the backlight module;
wherein the display panel is disposed between the privacy panel and the backlight module.

* * * * *